United States Patent [19]

Buan et al.

[11] Patent Number: 4,982,202

[45] Date of Patent: Jan. 1, 1991

[54] THERMAL PRINTING CARTRIDGE

[75] Inventors: Danilo P. Buan, Easton; Albert C. Chiang, Danbury; Donald T. Dolan, Ridgefield, all of Conn.

[73] Assignee: Pitney Bowes Inc., Stamford, Conn.

[21] Appl. No.: 251,012

[22] Filed: Sep. 27, 1988

Related U.S. Application Data

[63] Continuation of Ser. No. 585, Jan. 6, 1987, Pat. No. 4,777,831.

[51] Int. Cl.[5] ........................ B01D 15/10; B41J 32/00

[52] U.S. Cl. ............................ 346/76 PH; 346/76 R; 400/120; 400/194; 400/196; 400/198

[58] Field of Search ................ 346/1.1, 76 DA, 76 R; 400/120, 199, 198; 101/288; 430/40, 309, 348

[56] References Cited

U.S. PATENT DOCUMENTS

| | | | |
|---|---|---|---|
| 3,963,340 | 6/1976 | Gerace | 355/3 R |
| 4,407,002 | 9/1983 | Inui et al. | 346/76 PH |
| 4,463,360 | 7/1984 | Kikuchi et al. | 346/76 PH |
| 4,471,362 | 9/1984 | Murayama et al. | 346/76 PH |
| 4,481,518 | 11/1984 | Inui et al. | 346/76 PH |
| 4,504,840 | 3/1985 | Evans et al. | 346/76 PH |
| 4,511,902 | 4/1985 | Nagashima | 346/76 PH |
| 4,580,142 | 4/1986 | Matsushita et al. | 346/1.1 |
| 4,740,798 | 4/1988 | Shinoazani | 346/76 PH |

FOREIGN PATENT DOCUMENTS

| | | | |
|---|---|---|---|
| 62-62778 | 3/1987 | Japan | 400/120 |

*Primary Examiner*—Bruce A. Reynolds
*Assistant Examiner*—Gerald E. Preston
*Attorney, Agent, or Firm*—Donald P. Walker; Melvin J. Scolnick; David E. Pitchenik

[57] ABSTRACT

A printing cartridge adapted for use with thermal transfer printing apparatus. The cartridge includes a frame defining first and second printing stations, a ribbon supply spool, and a ribbon take-up spool, both of the spools being rotatably mounted on the frame. The ribbon has a backing layer and an ink donor layer and is guided in a feed path extending from the supply spool through the first and second printing stations, again through the first station, then to the take-up spool. The frame of the cartridge is adapted to receive a thermal printing head for engaging the ribbon at each of the first and second printing stations. The feed path has a first leg extending from the supply spool, through the first printing station, to the second printing station; a second leg extending through the second printing station to the first printing station; and a third leg extending through the first printing station to the take-up spool. A ribbon backing roller rotatably mounted on the frame engages the ribbon in the third leg of the feed path at the first printing station such that ink from the ribbon in the first leg of the feed path at the first printing station is transferred to the ribbon in the third leg of the feed path also at the first printing station. The thermal printing head at the second printing station engages the ribbon in the second leg of the feed path such that ink is transferred to a workpiece. The ink may be of the fluorescent type.

20 Claims, 4 Drawing Sheets

THERMAL PRINTING CARTRIDGE

This application is a continuation of application Ser. No. 000,585, filed Jan. 6, 1987, U.S. Pat. No. 4,777,831.

BACKGROUND OF THE INVENTION

Field of the Invention

This invention relates generally to printing and, more particularly, to thermal transfer printing suited to impart an indicia to a workpiece, e.g., a mail envelope.

Thermal transfer printing of an image to a workpiece is a known technology. Generally, thermal transfer printing utilizes a thermal print head consisting of a linear arrange of "ON-OFF" heating elements. Each element can be individually actuated in binary response to a generated bit input signal. Customarily, a control signal is generated by a control means, such as a programmable microcomputer, wherein a series of byte codes are transmitted to the thermal print head gating the individual heating elements to either an "ON" or "OFF" state in response to the control signal. A thermal ribbon coated on one side with thermally sensitive ink is passed between the thermal print head and a traversing workpiece. In response to the gating pattern of the print head elements, a serious of dots and spaces are created on the workpiece. As the gate information is sequentially transmitted to the thermal head in synchronized relationship to the traversing thermal ribbon and workpiece, an image is thereby imprinted to the workpiece.

Thermal transfer printing offers a most important advantage over die cast image transfer techniques, in that images transferred by thermal transfer printing have a superior resolution quality. However, thermal transfer printing quality is sensitive to the workpiece image transfer quality is limited by the capability of the thermal head to be subjected to high compression loads. High compression loads lead to shortened thermal head life. Therefore, the contact pressure between the workpiece, thermal ribbon, and thermal head must be maintained at a relatively low level. On the other hand, a workpiece having a rough surface texture has reduced surface contact with the thermal ribbon due to variations in evenness of surface contact by the ribbon, as compared with evenness of contact with a surface having a smooth surface area. As a result, a workpiece with a rough surface texture must be subjected to higher thermal head pressure to avoid providing an image lacking in resolution and contrast.

It would be advantageous if rough workpieces could be imaged by thermal transfer techniques in a manner preserving the superior imaging capabilities of thermal printing. In addition thermal transfer printers are programmable. The programmable capability of thermal transfer printing systems allows imaging flexibility which is not achievable with conventional die cast methods.

Substantial efforts have heretofore been made to remove or despoil the image remaining on the ink donor ribbon after printing has been performed on the workpiece. These attempts have been made to deny reuse of the ribbon. Examples of such efforts are provided by U.S. Pat. No. 4,407,002 issued Sept. 27, 1983 to Inui et al and U.S. Pat. No. 4,511,902 issued April 16, 1985 to Nagashima. Drawbacks of processes and apparatus for attaining this goal is that speed is reduced, and that the apparatus and the process is necessarily more complex and, therefore, more expensive.

It is with knowledge of the prior art and the shortcomings thereof that the present invention has been conceived and is now reduced to practice.

SUMMARY OF THE INVENTION

The printing method and apparatus of the invention may be used in conjunction with a mailing machine, with a mailing machine integrated into a postage meter, with a hand held device to deposit indicia directly on packages and flats, or may be employed in any other suitable combination. According to one use of the invention, then, an electronic postage meter may be mounted on a mailing machine such that a mailpiece stream can be delivered to a printing station. The electronic postage meter includes an input keyboard which communicates with a microcomputer which in turn, and among other operations, generates a bit information stream for delivery to a thermal transfer printing head associated with the electronic postage meter. The electronic postage meter contains a cartridge or cassette receiving section in the print station vicinity for receiving a thermal transfer ribbon cassette. The cassette contains a length of thermal transfer ribbon including a backing layer coated on one side with thermally sensitive ink and referred to as an ink donor layer. The ribbon is connected at this end to, and wrapped around, a supply spool mounted for one way rotation in the cassette and threaded therefrom around a plurality of guide rollers, first ribbon backing roller, and a take-up spool.

When inserted into a postage machine or bar code printer or other thermal printing device which is suitably adapted for receiving the cassette, the free, or leader, end of the ribbon extending from the supply spool, is fed between the ribbon backing roller and a thermal printing head at a first printing station. Downstream from the first printing station, the ribbon is fed between another ribbon backing roller and a thermal printing head at a second printing station with higher pressure provided by the second printhead. The thermal printing heads may be positionable by a position solenoid to facilitate entry of the cassette.

More specifically, the ribbon is guide in a feed path extending from the supply spool through the first and second printing stations, again through the first station, then to the take-up spool. The feed path has a first leg extending from the supply spool through the first printing station to the second printing station, a second leg extending through the second printing station to the first printing station, and a third leg extending through the first printing station to the take-up spool. The ribbon backing roller rotatably mounted on the frame engages the ribbon in the third leg of the feed path at the first printing station such that ink from the ribbon in the first leg of the feed path at the first printing station is transferred to the ribbon in the third leg in the feed path also at the first printing station. The thermal printing head at the second printing station engages the ribbon in the second leg of the feed path such that ink is transferred to a workpiece.

In operation, the microcomputer generates binary information which is sequentially transmitted to the thermal printhead at the first printing station. This causes an image to be traced onto the thermal ribbon in the third leg of the feed path from the thermal ribbon in the first leg of the feed path as both legs fed the thermal printhead at the first station. The ribbon continues to advance. Momentarily, that portion of the ribbon previously int he first leg of the feed path is located in the second leg of the feed path, specifically, at the thermal printhead at the second printing station. The contrast of the image imparted at the first station is imparted to a simultaneously fed mailpiece between the thermal printhead and the ribbon backing roller as the printhead is maintained at a temperature substantially higher than the threshold ink transfer temperature.

All that remains of the ribbon as it leaves the second printing station is the backing layer which continues to and through the first printing station once again for the operation already mentioned. Thereupon, the ribbon is drawn onto a take-up spool for eventual disposal. It is appreciated that by segregating the image generation and image transfer functions, increased pressure and temperature can be applied by the printhead during image transfer and, thereby, cause compression of the mailpiece surface area facilitating a higher resolution image transfer making the transfer system substantially less sensitive to mailpiece surface texture. Further, since the printhead engages the smooth backing surface of the tape, printhead life is enhanced due to low printhead wear. In addition printhead life is increased due to the need to maintain the printhead temperature constant at all times rather than cyclically subjecting it to peak voltage levels.

It is an object of the present invention to present a thermal image transfer apparatus and system which can accommodate workpieces of varying surface textures without substantial diminution in image resolution as a function of workpiece surface transfer area roughness.

It is a further objective of the present invention to present a thermal image transfer system and apparatus particularly suited for postage metering of mailpieces.

It is a still further objective of the present invention to present a thermal image transfer system particularly suited for employment in an electronic postage meter suitable for imparting a postage image on a workpiece stream traversing a postage meter mailing machine.

Another object of the invention is to avoid the need for a doctor blade or brush for cleaning ink from the transfer roller, by transferring the ink to the used MYLAR brand, or equivalent, ribbon surface for the removal of the positive image.

Still another object of the invention is that it may use a small size and mass of heating bar at each printhead enabling the apparatus to heat up to the transfer printing temperature and cool down below the transfer temperature instantaneously and assuring that the printer can be used immediately, even without a warm up period.

Yet another object of the invention is to enable use of a field replaceable, and relatively inexpensive, heating bar for the second printing station that can withstand high roller pressure and thereby provide improved print quality on rough surfaces such as envelopes, tapes, and papers.

Further objects of the present invention are to provide a reverse image to improve security while minimizing expense, and to provide consistent print quality, and to provide a higher level of fluorescent signal permitting ease of automatic detection.

Yet a further object of the invention is to provide significantly extended usage life-time for first printhead which results because of its direct contact with the smooth back side of the used ribbon. "MYLAR" brand, or equivalent, plastic ribbon is noted for its highly smooth surfaces.

By reason of the invention, a direct image eventually ends up on the backing ribbon which winds up on the takeup spool. Thus, the image cannot be used again since the image is negative, but it can still be read to provide a useful "audit trail" should such be desired.

It is also noteworthy that the Postal Service utilizes a detection system to separate mail with postage meter indicia thereon from mail bearing postage stamps. This system is sensitive to the amount of fluorescence in the ink as well as the amount of the printed area (typically 10%). At the same time, thermal printers consume variable amounts of power from their power supplies depending upon the amount of the printed area. These power supplies are low voltage, regulated types, the cost of which is proportional to the amount of power required. Normally, the requirements set forth above are conflicting since it is desired to print a large area for easy fluorescent detection and a small area for low power consumption. The proposed system has the advantage that if the first printing station prints a low power small area image, then the second printing station will print a large area, consistent with easy detection. The wattage required by the second printing station is less costly, since it has a less stringent requirement, that is, it has only to provide heat greater, by some margin, than the ink transfer temperature. Additionally, a negative indicia (90% print, 10% void) is more secure in that it is difficult to modify, that is, to change the postage value to a higher amount. There are a number of advantages, then, which result from large area printing. In a first instance, the first printing station can operate in a low power mode. Furthermore, the second printing station can operate in a fixed temperature mode driven by a low cost power supply. Additionally, since the first printing station is operating at low power, it implies low temperature which enables higher speeds of printing since printing speed is limited by the amount of heat generated at a printing head.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings which are incorporated in, and constitute a part of this invention, illustrate some of the embodiments of the invention and, together with the description, serve to explain the principles of the invention in general terms. Like numerals refer to like parts throughout.

DETAILED DESCRIPTION OF THE PREFERRED EMBODIMENT

The invention as depicted in its preferred embodiment is illustrated as a component of an electronic postage meter mailing machine for the purpose of imprinting a postage indicia on a workpiece to be mailed. However, it will be appreciated that the invention subsequently describe in its preferred embodiment is well suited for employment in a wide variety of other printing applications.

Figure 1:
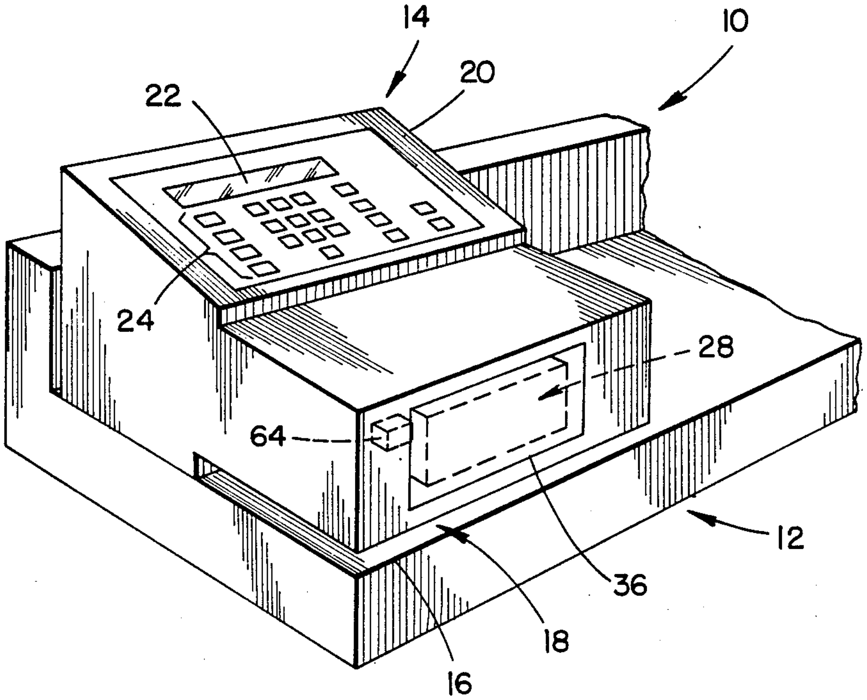
FIG. 1 is a partial perspective view of an electronically operated postage meter mailing machine embodying the invention.

Referring to FIG. 1, an electronic postage meter mailing machine, generally indicated at 10, includes a mailing machine 12 adapted to receive mailpieces, either by automatic means, such as, by a feeder (not shown), or manually, and an electronic postage meter 14. The meter 14 is mounted to the mailing machine 12, customarily in a detachable fashion, such that a portion of the meter 14 is positioned in spaced relationship opposite a mailing machine platen 16 to define an indicia printing station, generally indicated at 18. The meter 14 is generally comprised of a housing 20 having a display screen 22, a plurality of keys 24 operatively communicated with electronic circuitry 26 (FIG. 2) located within the housing 20 in any suitable manner.

Figure 2:
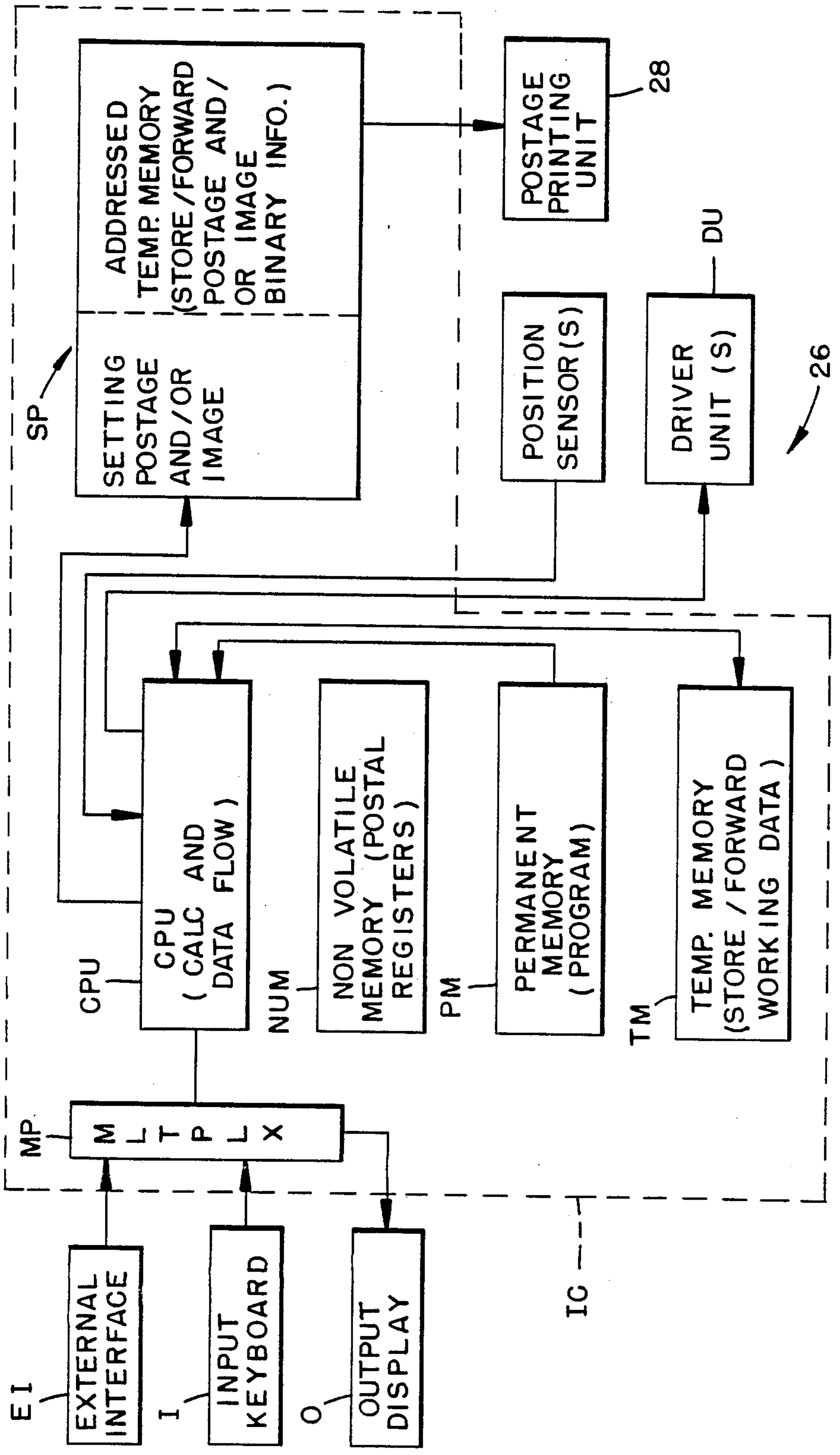
FIG. 2 is a schematic diagram of an electronic control system for operating the postage meter mailing machine of FIG. 1.

Referring now to FIGS. 1 and 2, the general functional arrangement of the computerized postal meter system of the present invention is known. The heart of the system is a CPU and it performs two basic functions: performance of calculations based on input data; and, controlling the flow of data between various memory units. Two basic memory units are employed with the CPU. The first is the permanent memory PM which is a non-alterable memory storing a specific sequence of operations for performing postal data calculations in accordance with certain predetermined inputs as well as performing other routines for operating the system. The second memory unit is a temporary memory TM which interacts with the CPU for forming a temporary storage, holding and forwarding working data in accordance with the calculations being performed by the CPU. An additional memory component NVM is also coupled to the CPU and performs a storage function which is very significant in the system operation of a postal data system. The NVM is a nonvolatile memory which acts to store certain critical information employed in the postal system as part of a predetermined routine activated upon start-up. The function of this routine is to store in the NVM (non-volatile memory) crucial accounting functions such as descending balances or ascending credits and the like, and store them such that they may be held while the machine is deenergized and recalled upon a subsequent start-up. In this manner, the computer system may continually act upon these balances in the NVM without fear of loss of this information upon shut-down.

The system operates in accordance with data applied from an appropriate input keyboard I or an external interface EI, such as a scale, external computer, mail management system, and the like. This data is fed into the CPU under control of the program in the permanent memory. At any time during the operation of the system, should the contents of the temporary memory storing the appropriate credit and debit balances or other accumulations in accordance with the various features of the system be desired to be displayed, an appropriate instruction provided by the input means I causes the CPU to access the desired location storing the information required. The information is provided through the CPU into the output display unit O. The input and output units may interface with the CPU via a multiplex unit MP. A more detailed description of a microcomputer system, such as here briefly described, can be found in commonly assigned U.S. Pat. No. 4,568,950 issued Feb. 4, 1986.

Under control of the CPU when appropriate postal data information is provided from the input I, and all of the conditions such as limits and the like which may be preset in accordance with the entered data in storage in the NVM, are satisfied, a postage setting device SP will respond to an appropriate output signal from the CPU to generate a binary bit message addressed to a constituent temporary memory. At this point, the system has accomplished its initial function of setting the postage and readying the thermal printing system for image creation.

Figure 3:
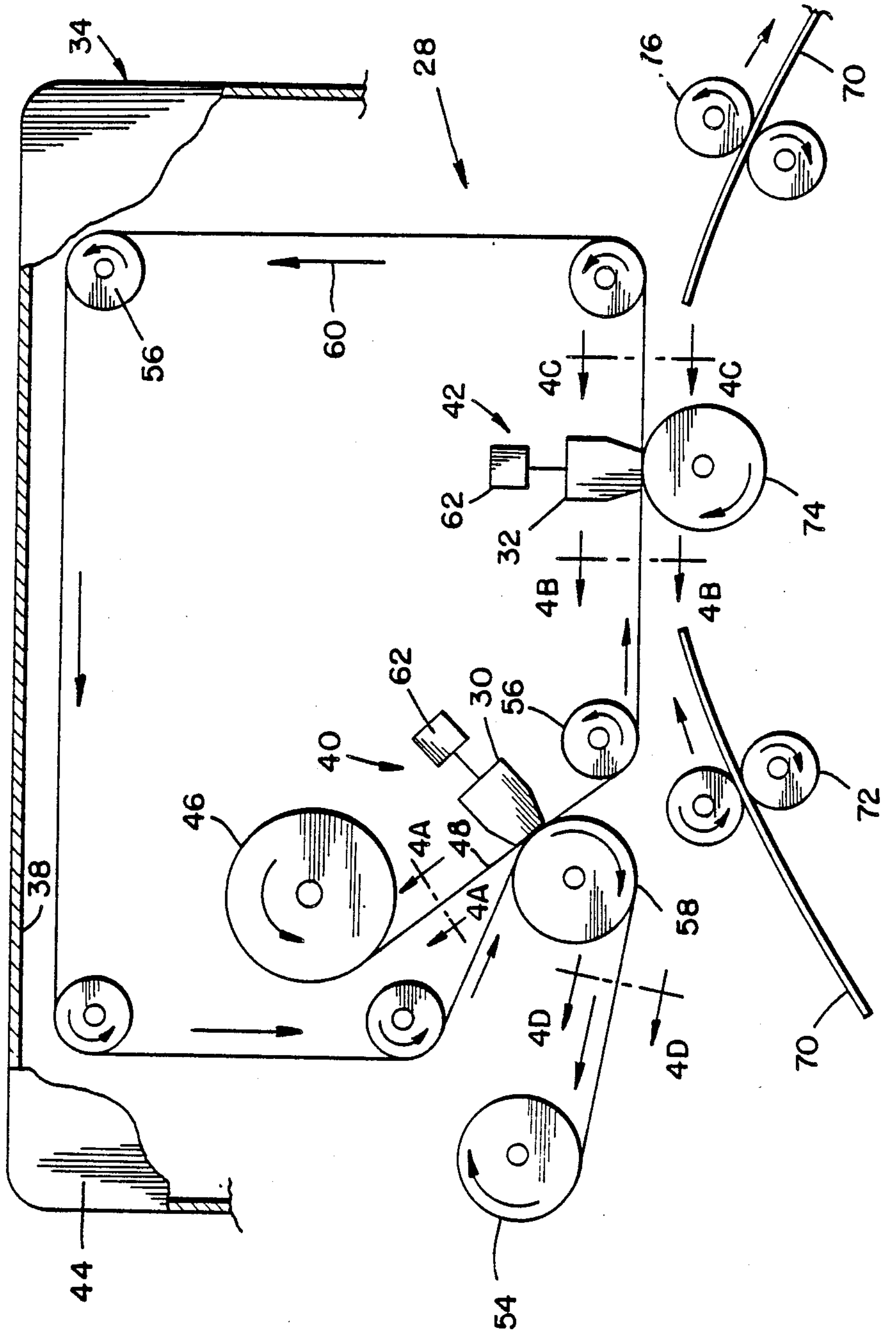
FIG. 3 is a diagrammatic view of the thermal ribbon cassette as positioned within the postage meter in accordance with the present invention.

Referring now to FIG. 3, a postage printing unit 28 associated with the postage meter 14 includes a pair of spaced apart thermal printheads 30, 32, and a ribbon cartridge or cassette 34. The thermal printheads 30, 32 are of conventional design such as those available from Ricoh Company Ltd. of San Jose, Calif. or Kyocera Company, Kyota, Japan. A typical device is shown and described in U.S. Pat. No. 4,429,318 issued Jan. 31, 1984 to Kobata. The thermal printheads 30, 32 are serial-sequence binary responsive to the output of the microcomputer IC.

The ribbon cassette 34 is admitted into the housing 29 through a hinged door 36 (see FIG. 1) and is detachably mounted therein by any conventional and suitable means. The ribbon cassette 34 includes a frame 38 which defines first and second printing stations, 40 and 42, respectively, and an integral enclosure 44 which contains a number of components which will be described. A ribbon supply spool 46 is rotatably mounted within the cassette 34 and is wound with a thermal ribbon 48 which has a extending therefrom. The thermal ribbon 48 includes a backing layer 50 which is preferably composed of a "MYLAR" brand plastic film, or equivalent, approximately 0.25 to 0.5 mils in thickness.

The thermal ribbon 48 also includes an ink donor layer 52 (FIG. 4A) which is a thermally activated ink coating applied to the exposed side of the backing layer 50.

A ribbon take-up spool 54 is also rotatably mounted on the frame 38, the leader end of the thermal ribbon 48 being suitably connected to the take-up spool. A plurality of idler rollers 56 are also rotatably mounted on the frame 38 within the enclosure 44 and serve to guide the thermal ribbon 48 along a feed path which extends from the supply spool 46, through the first and second printing stations, 40 and 42, respectively, and again through the first printing station 40, then around a ribbon backing roller 58 which is positioned at the first printing station 40 and eventually onto the take-up spool 54.

When the cassette 34 is inserted into the package printing unit 28, the take-up spool 54 is operatively engaged with a driver unit DU (FIG. 2) which appropriately rotates the take-up spool and draws the thermal ribbon 48 from the supply spool 46 and advances it along the feed path just described in the direction of arrows 60. To facilitate threading or positioning of the thermal ribbon 48 as the cassette 34 is inserted into the postage printing unit 28, each thermal printhead 30, 32, is preferably capable of being moved from a withdrawn or threading position to an active position as illustrated in FIG. 3. This movement may be achieved by means of an electrically responsive two position solenoid 62 operatively associated with each thermal printhead. The solenoids 62 are actuated by a door switch 64 (see FIG. 1) in a conventional manner upon the opening of the door 36. Closing of the door 44 causes deactuation of the switch 64 and, thereby, causes the solenoids 62 to reposition the thermal heads 30, 32 to their original, or active, positions.

It will also be appreciated that the bearings rotatably mounting the supply spool 46, idler rollers 56, and the ribbon backing roller 58 are designed to assure that the thermal ribbon 48 experiences a proper magnitude of tension, neither too little nor too much, as it advances along the feed path within the cassette 34.

Viewing FIG. 3, it is readily seen that the feed path for the thermal ribbon 48 has a first leg which extends from the supply spool 46, through the first printing station 40, to the second printing station; a second leg extending through the second printing station 42 back to the first printing station 40; and a third leg extending through the first printing station 40, around the ribbon backing roller 58 and to the take-up spool 54.

The printheads 30, 32 may utilize a heating bar (not shown) of known construction. The heating bar may be separate from the printhead or be combined therewith and, in either event, should be able to operate at a pressure in the range of 2 lbs. per inch to 20 lbs. per inch during its operation without appreciable wear. Desirably, the heating bars used are of small size and mass enabling the printer to be used immediately without a warm-up period. In short, the heating bars should be capable of obtaining the required transfer temperature instantly and should also be able to drop their temperature below transfer temperature instantly. Also, the heating bars should be field replaceable and relatively inexpensive, yet able to withstand high roller pressure thereby assuring improved print quality on rough surfaces such as envelopes, tapes, and textured papers.

Figure 5A:
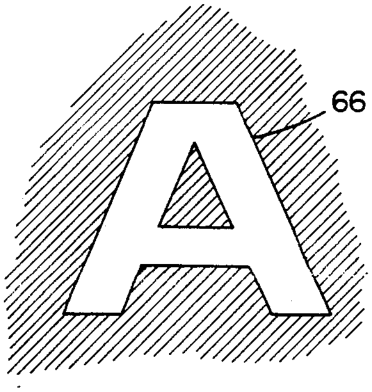
FIG. 5A represents a first image transferred according to the invention and FIG. 5B represents a second image so transferred, the second image being a reverse of the first image.
Figure 4A:
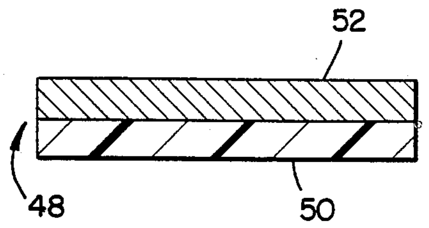
FIGS. 4A, 4B, 4C, and 4D are exaggerated cross section view of the thermal ribbon at various positions along its feed path within the cassette in accordance with the present invention.
Figure 4B:
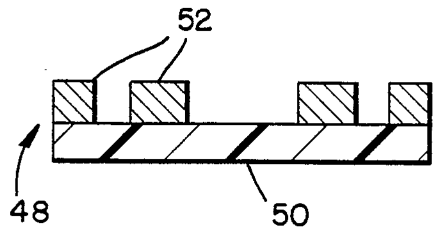
Figure 4C:
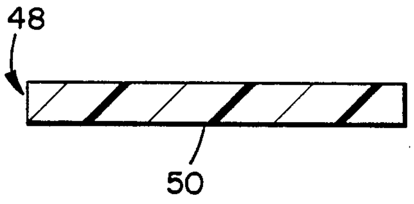
Figure 4D:
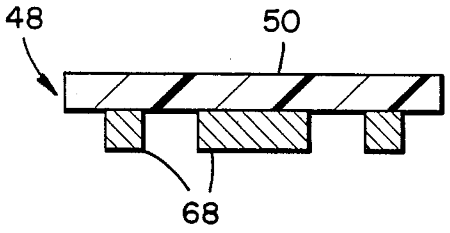

Turning one again to FIG. 3, it is seen that the two portions of the thermal ribbon 48 pass simultaneously through the first printing station 40. As the thermal ribbon 48 is drawn from the supply spool 46, it has a cross section as illustrated in FIG. 4A, specifically, comprising a backing layer 50 with a complete or unaltered ink donor layer 52. However, as the ribbon advances through the printing station 40, the ink donor layer 52 faces the backing layer of that portion of ribbon which has most recently been advanced from the second printing station 42. As suitable instructions are received from the microcomputer IC (FIG. 2), ink is transferred from the ink donor layer 52 of the unmodified portion of the thermal ribbon 48 (FIG. 4A) onto that portion of the ribbon 48 for which only the backing laying 50 remains (FIG. 4C). This results in an image having the nature illustrated in FIG. 5A, namely, in the form of an outline-of-indicia 66, hereinafter alternatively referred to as the background image, from the ink donor layer to the backing layer. FIG. 4D is illustrative of the again modified thermal ribbon 48 which, after it leaves the printing station 40 for the second time and advances toward the take-up spool 54, has quantities of ink 68 deposited on its back surface, thereby defining the outline-of-indicia 66 as seen in FIG. 5A. It will be appreciated that the back surface of the thermal ribbon 48 is the surface opposite that on which the ink donor layer 52 is applied, as seen in FIG. 4A. FIG. 4B is illustrative of that portion of the thermal ribbon 48 which has been fed from the supply spool 46 and is situated between the printing stations 40 and 42.

As that length of ribbon 48 coming from the supply spool 46 advances past the printing station 40 and approaches the printing station 42, it appears generally in cross section as seen in FIG. 4B which is the reverse image of the structure illustrated in FIG. 4D. Thus, when that portion of the ribbon 48 from which the outline-of-indicia 66 was transferred to the backing layer at the printing station 40, reaches the printing station 42, all of the ink from the ink donor layer 52 remaining is then transferred to a workpiece 70 which is suitably advanced by means of feed rolls 72 into the printing station 42. The workpiece 70 actually travels between a ribbon backing roller 74 which is rotatably mounted on the printing unit 28 and operates in a suitable manner to apply adequate pressure to the workpiece 70 and against the printhead 32 to assure that a clear image will result. The workpiece 70 is thereafter withdrawn from the printing station 42 by means of another pair of feed rolls 76. It is preferred, for optimal performance, that the backing rollers 58 and 74 and the feed rolls 72 and 76 have smooth surfaces, hardness of 40 to 80 durometer, short A, and a high coefficient of friction.

The image applied to the workpiece 70 at the printing station 42 may be in the form of indicia 78 which is the reverse image of the outline-of-indicia 66 illustrated in FIG. 5A. Once the image, whether the outline-of-indicia 66 or the indicia 78, has been applied to the workpiece 70, that length of the thermal ribbon 48 leaving the printing station 42 will, in actuality, be only the backing layer 50 as seen in FIG. 4C. It is to this backing layer that the outline-of-indicia 66 will again be applied at the first printing station 40 and will thereafter continue to the take-up spool 54.

Figure 5B:
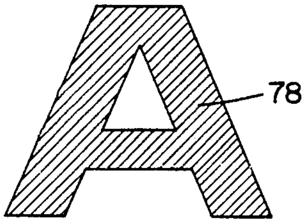

Although it has been described that the outline-of-indicia 66 is applied to the backing layer 50 at the first station 40, the images may be reversed. That is, it may be that the indicia 78 (FIG. 5B) will be transferred to the backing layer 50 at the first station and the outline-of-indicia 66 will be transferred to the workpiece 70 at the second printing station 42. Benefits of the latter reside in the fact that it is more difficult for a counterfeiter to alter an image having the nature of FIG. 5A than that of FIG. 5B. Additionally, since more ink is involved in providing the image of FIG. 5A rather than that of FIG. 5B, much less luminous material, which is costly, is required with resultant cost savings being realized.

While the image remaining on that portion of the ribbon would onto the take-up spool 54 may provide an interloper with an "audit trail", that is, an ability to review individual amounts of postage which were applied to envelopes in the course of operation of the postage meter 14, the ribbon 48 remains sealed within the cassette 34 and not accessible unless that interloper chooses to destroy it and thereby gain entry into it. Also, the resultant ribbon is unusable, for example, as postage indicia. That is, if lengths of the ribbon 48 on the take-up spool 54 were to be cut up and applied to an envelope as postage, it would be readily visible to a postal clerk and rejected. Nor could the ribbon be used to reapply the ink thereon to a workpiece 70 since the resultant image would be a mirror image of either the indicia 78 or outline-of-indicia 66 which would be unacceptable for postal purposes and, again, readily rejected.

While a preferred embodiment of the invention has been disclosed in detail, it should be understood by those skilled in the art that various modifications may be made to the illustrated embodiment without departing from the scope thereof as described in the specification and defined in the appended claims.

What is claimed is:

1. An article of manufacture adapted for use with printing apparatus of the type which includes means for thermally transferring ink from a ribbon to a mail piece, the article comprising:

(a) a frame defining first and second printing stations, said first printing station having a first thermal printhead and said second printing station having a second thermal printhead;

(b) a ribbon including a backing layer and an ink donor layer;

(c) a ribbon supply spool rotatably mounted on said frame, said ribbon would on said supply spool and having a leader end extending therefrom;

(d) a ribbon take-up spool rotatably mounted on said frame, said leader end of said ribbon connected to said take-up spool; and (e) means for guiding said ribbon in a feed path extending from said supply spool through said first and second printing stations and again through said first printing station to said take-up spool such that said ink donor layer and said backing layer face each other at said first printing station, whereby some but not all ink from said ink donor layer may be thermally transferred to said backing layer at said first printing station, and such that substantially all of the ink remaining in the ink donor layer after exiting said first printing station may be thermally transferred to said mailpiece at said second printing station.

2. The article according to claim 1, wherein said ribbon guiding means includes a ribbon backing roller rotatably mounted on said frame at said first printing station.

3. The article according to claim 1, wherein the feed path has a first leg extending from said supply spool through said first printing station to said second printing station, a second leg extending through said second printing station to said first printing station, and a third leg extending through said first printing station to said take-up spool.

4. The article according to claim 1, wherein said frame includes a hollow enclosure; and wherein said ribbon supply and take-up spools, respectively, are mounted on said frame within said enclosure.

5. The article according to claim 1, wherein said ink donor layer includes a heat fusible ink impregnated material, and said backing layer includes a strip of smooth plastic film.

6. The article according to claim 2, wherein said first thermal printhead is provided adjacent to said ribbon backing roller for engaging said backing layer of said ribbon at said first printing station.

7. The article according to claim 3, wherein said first thermal printhead is located for engaging said ribbon in the first leg of the feed path at said first printing station.

8. The article according to claim 3, wherein said second thermal printhead is located for engaging said ribbon in the second leg of the feed path at said second printing station.

9. The article according to claim 3, wherein said ribbon guiding means includes a ribbon backing roller for engaging said ribbon in the third leg of the feed path at said first printing station.

10. The article according to claim 7, wherein said ribbon guiding means includes a ribbon backing roller for engaging said ribbon in the third leg of the feed path at said first printing station, whereby ink from said ribbon in the first leg of the feed path at said first printing station may be transferred to said ribbon in the third leg of the feed path at said first printing station.

11. The article according to claim 10, wherein said second thermal printhead is located for engaging said ribbon in the second leg of the feed path at said second printing station.

12. The article according to claim 5, wherein said ink inpregnated material is fluorescence pigmented.

13. Printing apparatus for mailpieces comprising: (a) first and second spaced stations having, respectively, first and second thermal printheads, (b) means for passing a mailpiece through the second station for printing postage indicia thereon, (c) a transfer medium comprising a continuous plastic tape having a layer of heat transferable ink on its front side, (d) supply and takeup means for the transfer tape, (e) means for guiding the transfer tape from the supply means through the first station in a first pass such that the tape back side during the first pass faces the first printhead, thence through the second station such that the tape back side faces the second printhead and the tape front side faces the mailpiece, thence back through the first station in a second pass such that the tape back side during the second pass faces the tape front side during the first pass, thence to the takeup means, (f) means for applying a negative imaging signal to the first printhead to cause substantially all of the non-image ink portions on the tape during its first pass to be transferred to the back side of the tape during its second pass leaving on the tape front side as it approaches the second station substantially only an ink image, and (g) means for applying to the second printhead non-imaging electrical power to cause the second printhead to raise the temperature of the entire tape portion as it passes through the second station to a temperature sufficiently high to cause all of the ink image remaining on the tape to be transferred to the mailpiece.

14. Printing apparatus as claimed in claim 13, wherein the first printhead is a low power printhead, and the second printhead is a large area printhead.

15. Printing apparatus as claimed in claim 14, wherein means for provided at each printhead such that the pressure applied by the second printhead against the tape and against the mailpiece is greater than that applied by the first printhead.

16. Printing apparatus as claimed in claim 15, wherein the applying means at each head are such that the amount of heat provided at the first printhead is smaller than that applied at the second printhead.

17. Printing apparatus as claimed in claim 16, wherein the second printhead is maintained continuously at least at an elevated temperature below the temperature required to transfer ink from the tape when in contact therewith.

18. Printing apparatus as claimed in claim 13 wherein the plastic tape has a smooth back side.

19. Printing apparatus as claimed in claim 13 wherein element (g) is such that all of the ink remaining on the tape as it passes through the second station is transferred to the mailpiece.

20. A cartridge comprising:

a housing, first and second thermal printheads, a supply roll, a back-up roller, and a take-up roll all rotatably mounted to the housing;

wherein the back-up roller and the first thermal printhead face each other and define therebetween a first printing station, and the second thermal printhead defines one side of a second printing station; and a ribbon wound on said supply roller and having an inked side and a back side, and paid out from the supply roll, then passing in a first run through the first station, with the back side of the ribbon facing the first printhead, then through the second station, with the back side of the ribbon facing the second printhead and the inked side facing a surface to be printed, then in a second run through the first station, between the back-up roller and the first run of the ribbon through the first station, and then to the take-up roll;

wherein the non-image portions of a desired image can be transferred from the first run to the second run of the ribbon at the first station and the remaining image portions can be transferred by the second printhead from the ribbon to the surface at the second station.

* * * * *